Aug. 16, 1960

S. D. SILLIMAN 2,949,582

PULSE GENERATORS

Filed April 25, 1956

WITNESSES:
Bernard R. Giegucz
Leon J. Taja

INVENTOR
Sheldon D. Silliman
BY
Francis V.B. Giolma
ATTORNEY

United States Patent Office 2,949,582

Patented Aug. 16, 1960

2,949,582

PULSE GENERATORS

Sheldon D. Silliman, Pittsburgh, Pa., assignor to Westinghouse Electric Corporation, East Pittsburgh, Pa., a corporation of Pennsylvania Filed Apr. 25, 1956, Ser. No. 580,616

9 Claims. (Cl. 331—113)

My invention relates generally to pulse generators, and it has reference in particular to a pulse generator using static circuit elements.

Generally stated, it is an object of my invention to provide a pulse generator that is simple and inexpensive to manufacture and is reliable and effective in operation.

More specifically, it is an object of my invention to provide in a pulse generator for using only static circuit elements.

Another object of my invention is to provide in a pulse generator for using a transistor flip-flop or memory circuit having two stable states with a pair of transistor delay circuits for alternately triggering the flip-flop from one stable state to another.

Yet another object of my invention is to provide in a static element pulse generator for utilizing only a single source of supply voltage for the several circuit elements of the generator.

Another object of my invention is to provide a simple yet stable pulse generator utilizing semiconductor devices.

Still another object of my invention is to provide a pulse generator utilizing a transistor multivibrator circuit with separate delay circuits for controlling the "On" and "Off" intervals of the pulses.

It is also an important object of my invention to provide a stable static device pulse generator which is materially unaffected by changes in supply voltage.

Other objects will, in part be obvious and will, in part, be explained hereinafter.

In practicing the present invention in a preferred form, a flip-flop circuit is utilized comprising a direct-coupled transistor multivibrator that toggles from one stable state to another when the voltage at one terminal is reduced below a predetermined value and toggles back to the first stable state when the voltage at another terminal is reduced below the predetermined value. Such a multivibrator is basically described in an article by R. H. Beter et al., entitled "Directly Coupled Transistor Circuits," beginning on page 132 of Electronics for June, 1955. Separate time delay switching circuits of a type described in the copending application, Serial No. 580,615 of Sheldon D. Silliman et al., filed April 25, 1956, now Patent No. 2,845,548 granted July 29, 1958 are connected to be respectively responsive to the "On" and "Off" states of the multivibrator for alternately reducing the voltage at the "On" terminal and the "Off" terminal below the predetermined value, so that the multivibrator is alternately triggered from one state to the other to periodically provide substantially square wave pulses.

Figure 1:
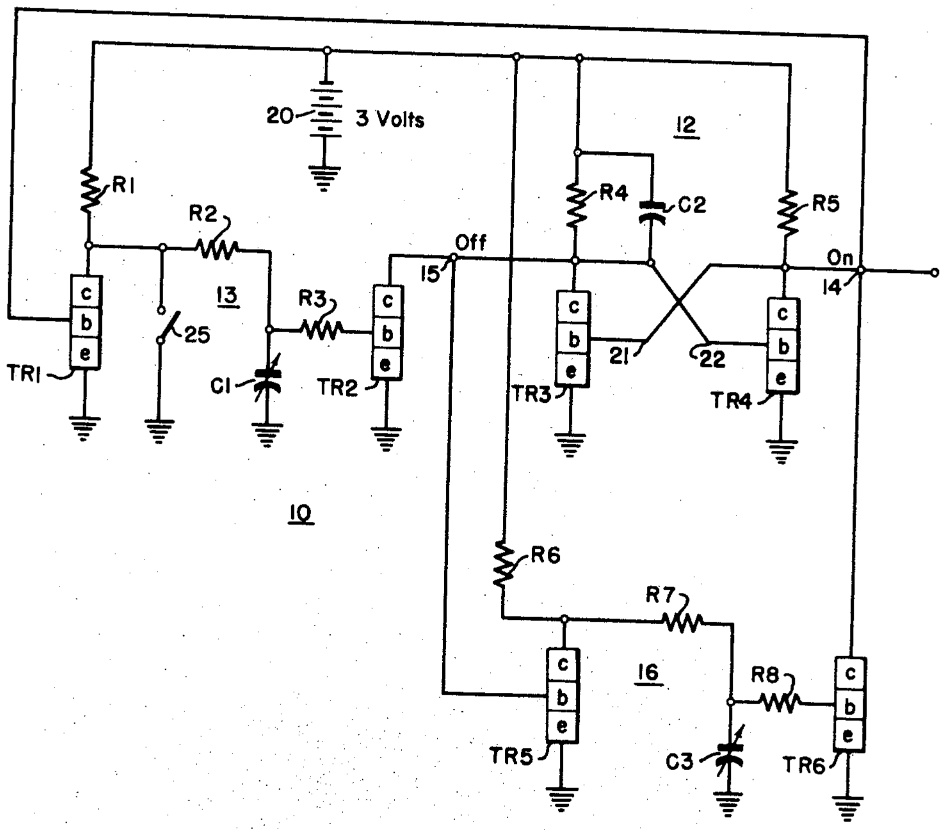
Figure 2:
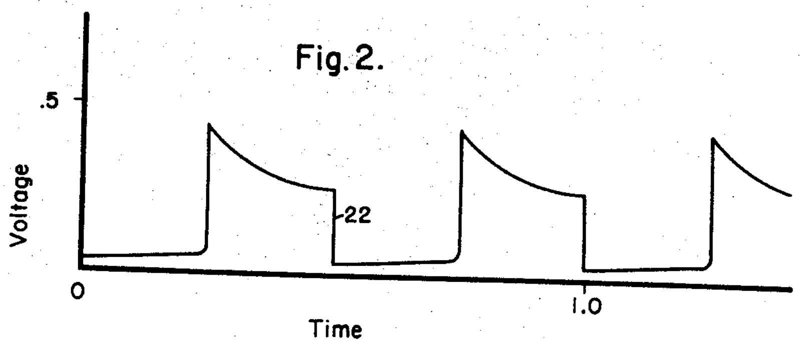

For a more complete understanding of the nature and scope of my invention, reference may be made to the following detailed description, which may be read in connection with the accompanying drawing, in which:

Figure 1 is a schematic diagram of a pulse generator embodying the invention in one of its forms; and Fig. 2 shows a characteristic wave form of the pulse generator shown in Fig. 1.

Referring to Fig. 1 of the drawing, the reference numeral 10 denotes generally a static pulse generator comprising a flip-flop memory circuit 12 having a time delay circuit 13 responsive to reduction of the "On" output voltage at terminal 14 to reduce the voltage at the "Off" terminal 15 after a predetermined time delay. An additional time delay circuit 16 responds to a reduction of voltage at the "Off" output terminal 15 to reduce the output voltage at the "On" terminal 14 a predetermined time later, thus triggering the flip-flop circuit 12 alternately from the "On" to the "Off" condition.

The flip-flop circuit 12 is substantially of the type described in the Beter et al. article and the copending Silliman et al. application. It comprises a pair of transistors TR3 and TR4 which may be of the point contact type, or of any junction type, such as the surface barrier type, or alloy fused junction type. As shown, the transistors TR3 and TR4 are of the p-n-p surface barrier type with their emitters *e* directly connected to ground and their collectors *c* connected to a negative source of supply voltage represented by the battery 20 through resistors R4 and R5, respectively. The base electrodes *b* and the collectors *c* of the transistors are cross-connected by conductors 21 and 22, respectively. A capacitor C2 is connected in shunt with the resistor R4 so as to act as a momentary short circuit when the transistors are first connected to the battery 20, to permit the transistor TR4 to initially saturate and become conductive. This substantially grounds the collector *c* of resistor TR4, thus changing the voltage at the "On" terminal 14 to about —.05 volt.

The time delay circuit 13 comprises a transistor switch TR2 which is connected from the terminal 15 to ground and is controlled through a resistor R3 by a transistor TR1 in conjunction with an RC circuit comprising a resistor R2 and a capacitor C1. The resistor R2 and the capacitor C1 are connected from the battery 20 to ground through a resistor R1. The transistor TR1 is connected in shunt with the resistor R2 and the capacitor C1. The base *b* of transistor TR1 is connected to the "On" terminal 14 so that as soon as the transistor TR4 saturates, and changes the voltage of terminal 14 to substantially ground potential, it also grounds the base *b* of TR1. This blocks the transistor TR1 and removes the shunt about the capacitor C1. The capacitor, therefore, commences to charge from the battery 20 and when the base electrode *b* of transistor TR2 becomes sufficiently negative, transistor TR2 saturates and connects the "Off" terminal 15 to ground. This raises the voltage of the collector *c* of transistor TR3 to almost ground potential and also the base *b* of transistor TR4, thus blocking transistor TR4 and rendering transistor TR3 conductive.

The time delay circuit 16 is similar to the time delay circuit 13 except that the transistor TR5 is controlled by raising to ground voltage at the "Off" output terminal 15, to effect charging of the capacitor C3 to saturate the transistor TR6 and ground the "On" output terminal 14 for triggering the flip-flop circuit 12 back to its initial condition.

When the supply voltage from the battery 20 is first applied, transistor TR4 saturates, and transistor TR3 is blocked or cut off. As previously explained, this initial state condition results from the charging current of the capacitor C2 flowing through the transistor TR4. At the same time, transistor TR1 is blocked or cut off and transistor TR5 is saturated. With transistor TR1 cut off, the capacitor C1 is charged from the battery 20 by current flowing through the resistors R1 and R2. Because transistor TR5 is saturated, the capacitor C3 is effectively shorted. As the voltage on the base *b* of the transistor TR2 increases in negative value transistor TR2 saturates, changing the voltage of the collector *c* of transistor TR3 from approximately —0.45 volt to essentially ground potential. As the voltage changes from −0.45 volt to ground potential, the flip-flop 12 toggles, and with transistor TR3 saturated and transistor TR4 cut off, a signal of −0.45 volt appears at the "On" output terminal 14, while transistor TR1 saturates and transistor TR5 is cut off. Condenser C1 is, therefore, effectively shorted through resistor R2, and capacitor C3 commences to charge through resistors R6 and R7. When the voltage of base *b* of transistor TR6 rises sufficiently, the transistor TR6 saturates, changing the collector voltage of transistor TR4 from −0.45 volt to essentially ground potential, thus restoring the flip-flop to its initial state condition.

A characteristic output curve 22 of the pulse generator 10 is shown in Fig. 2. A frequency of approximately two pulses per second resulted, using the following values:

| | |
|---|---|
| Resistors R1, R3, R6, R8 | 6800 ohms. |
| Resistors R2 and 7 | 100 ohms. |
| Resistors R4 and R5 | 1000 ohms. |
| Capacitors C1 and C3 | 50 mfds. |
| Capacitor C2 | 470 mmfds. |
| Transistors TR1 through TR6 | SB–100. |
| Supply voltage | 3 volts. |

These values are merely typical of one circuit arrangement which has been satisfactorily tested. All of these values are, of course, associated with the particular type of transistor used. Any number of different types of transistors may be used and the values of the components will vary accordingly.

By using capacitors C1 and C3 having a value of 10 microfarads, the pulse rate is approximately 20 pulses per second. Changing the supply voltage from −3.0 to −1.5 volts does not materially affect the pulsing rate, thus showing that the pulse generator is stable and relatively insensitive to variations in supply voltage. The pulse duration and the time between pulses can be changed independently of the pulse rate if desired by varying the value of the resistors R1 and R6 in opposite senses. The pulse generator 10 is essentially free running and may be provided with control means such as a switch 25 for grounding the collector of transistor TR1 to stop pulsing. When the switch 25 is opened, pulsing commences after the time delay provided by the delay circuit 13.

From the above description and the accompanying drawing, it will be seen that I have provided in a simple and effective manner for providing a static pulse generator utilizing semiconductor switch devices. The pulse rate and pulse duration may be independently varied by selectively varying the capacitors C1 and C3 and the resistors R1 and R6. For example, if the delay of circuits 13 and 16 is increased, the pulse rate will be decreased. If the delay is decreased, the rate will be increased. If the delay of 13 is increased, and the delay 16 decreased a like amount, the rate will be unchanged. A pulse generator embodying the features of my invention is highly stable, requiring but a single source of supply voltage and is basically unaffected by relatively wide variations in the value of the supply voltage. While the invention has been described in connection with transistors of the surface barrier type, it will be understood that contact type, fused alloy junction and other types may be used as readily.

Since certain changes may be made in the above described construction and different embodiments of the invention may be made without departing from the spirit and scope thereof, it is intended that all the matters contained in the above description and shown in the accompanying drawing shall be considered as illustrative and not in a limiting sense.

I claim as my invention:

1. In a pulse generator; a bistable multivibrator having a first stable state wherein a voltage appears at one set of terminals in response to reduction of the voltage at another set of terminals below a predetermined value, and a second stable state wherein a voltage appears at said another set of terminals in response to reduction of the voltage at said one set of terminals below a predetermined value; a delay circuit responsive to the reduction of voltage at said another set of terminals to reduce the voltage at said one set of terminals, and an additional delay circuit responsive to reduction of the voltage at said one set of terminals to reduce the voltage at said another set of terminals.

2. A pulse generator comprising, a pair of transistors each having a base electrode, a grounded emitter and a collector; circuit means connecting the base electrode of each transistor to the collector of the other transistor; impedance means connecting the collectors to a source of bias voltage; a delay circuit connecting the collector of one transistor to the collector of the other transistor, and a separate delay circuit connecting the collector of the other transistor to the collector of said one transistor.

3. A pulse generator comprising, a pair of transistors direct-connected in a bistable multivibrator circuit having collectors and grounded emitter electrodes, a transistor delay circuit connected from one collector to the other for grounding said other collector a predetermined time after said one collector is grounded, and an additional transistor delay circuit connected in the opposite sense between the collectors.

4. In a pulse generator, a pair of transistors having grounded emitters and cross-connected base and collector electrodes, impedance means separately connecting the collectors to a source of negative bias voltage relative to the emitters, a time delay circuit having a resistance-capacitor circuit controlling a transistor switch connecting the collector of one of the cross-connected transistors to ground a predetermined interval of time after the voltage of the collector of the other of the cross-connected transistors is reduced below a predetermined level, and another time delay circuit including a resistance-capacitor circuit controlling a transistor switch connecting the collector of the other of the cross-connected transistors to ground a variable predetermined time after the voltage of the collector of said one cross-connected transistor is reduced below a predetermined value.

5. A pulse generator comprising, a flip-flop circuit having a pair of terminals operable to produce an output voltage at one of said terminals when the voltage at the other terminal is reduced below a predetermined value and produce an output voltage at said other terminal when the voltage at said one terminal is reduced below a predetermined value, switch means including a delay circuit connected to said other terminal and said one terminal operable to reduce the voltage at said one terminal below said predetermined value a predetermined time after the voltage at said other terminal is reduced, and additional switch means including a delay circuit connected to said one terminal and said other terminal in the opposite sense.

6. A pulse generator comprising, a flip-flop circuit having a pair of terminals, said flip-flop circuit having two stable states, one in which an output voltage appears at one terminal when the voltage at the other terminal is reduced below a predetermined value, and another in which an output voltage appears at said other terminal when the voltage at said other terminal is reduced below said value, delay switch means operable to reduce the voltage at said one terminal below a predetermined value a predetermined time after the voltage at the other terminal is reduced below said value, and additional delay switch means operable to reduce the voltage of said other terminal a predetermined time after the voltage at said one terminal is reduced.

7. A pulse generator comprising: a bistable multivibrator with a pair of output terminals and having a first stable state wherein an output voltage appears at one terminal while the voltage at the other terminal is below a predetermined value, and a second stable state wherein an output voltage appears at said other terminal when the voltage at said one terminal is reduced below said predetermined value; delay means including a switch connected to said one terminal, a capacitor-resistance delay circuit connected to operate the switch, and a switch device connected to said another terminal operable to permit timed charging of the capacitor in response to reduction of the voltage at said another terminal below said predetermined value to operate said switch device; and additional delay means including another switch connected to said another terminal to reduce the voltage thereof below said predetermined value, a capacitor-resistance delay circuit for operating the additional switch, and another switch device connected to respond to the voltage at said one terminal to permit charging of the capacitor when the voltage of said one terminal is reduced below said predetermined value to operate said additional switch.

8. A pulse generator comprising, a bistable multivibrator having a first stable state wherein a voltage appears at first terminals in response to reduction of voltage at second terminals below a predetermined value, and a second stable state wherein voltage appears at said second terminals in response to reduction of voltage at said first terminals below a predetermined value, a delay circuit connecting said first terminals to said second terminals, and another delay circuit connecting said second terminals to said first terminals.

9. In a pulse generator, a bistable multivibrator having a first stable state wherein a voltage appears at first terminals in response to reduction of voltage at second terminals below a predetermined value, and a second stable state wherein voltage appears at said second terminals in response to reduction of voltage at said first terminals below a predetermined value, and independently adjustable unidirectional delay circuits connected in opposite senses between said first terminals and said second terminals.

References Cited in the file of this patent

UNITED STATES PATENTS

| | | |
|---|---|---|
| 2,550,116 | Grosdoff | Apr. 24, 1951 |
| 2,644,887 | Wolfe | July 7, 1953 |
| 2,831,127 | Braicks | Apr. 15, 1958 |